May 5, 1942.                    O. WITTEL                    2,282,016
                          FILM SUPPORT ASSEMBLY
                           Filed July 26, 1939
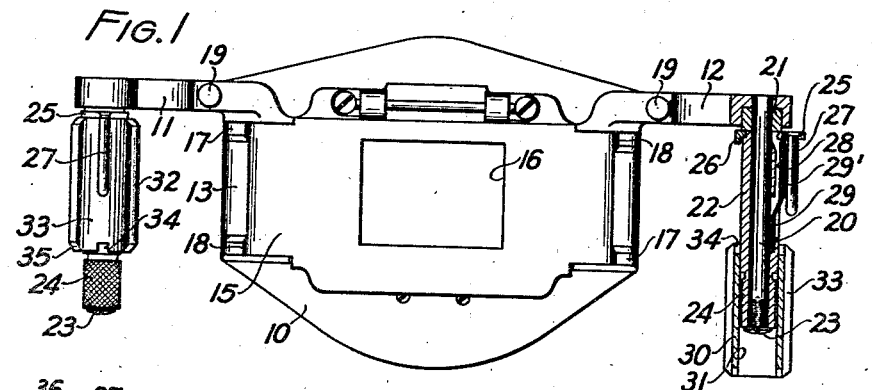
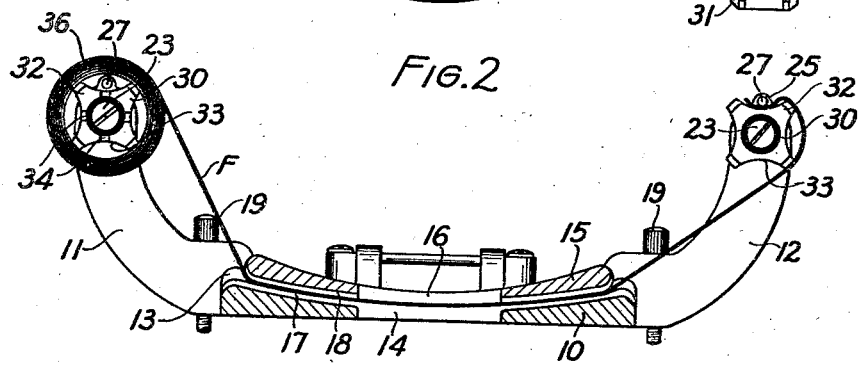
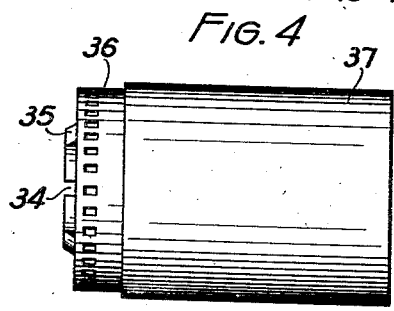
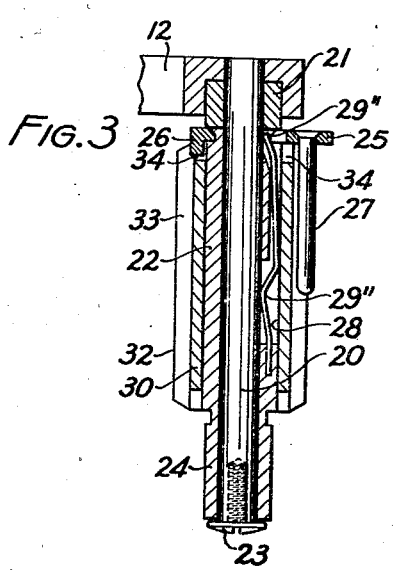
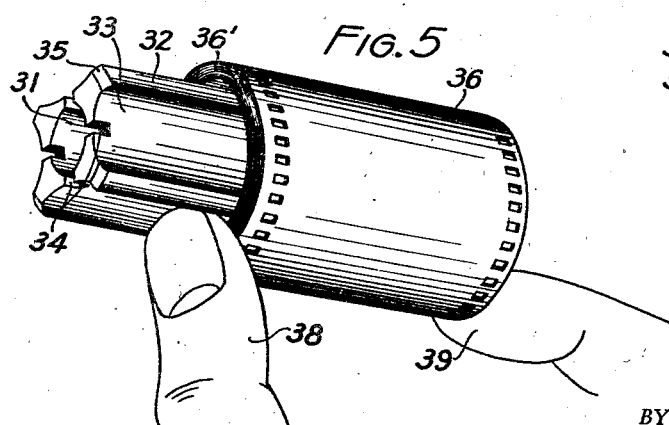
OTTO WITTEL
INVENTOR
BY
George A. Gillett, Jr.
ATTORNEYS Patented May 5, 1942

2,282,016

UNITED STATES PATENT OFFICE 2,282,016

FILM SUPPORT ASSEMBLY

Otto Wittel, Rochester, N. Y., assignor to Eastman Kodak Company, Rochester, N. Y., a corporation of New Jersey Application July 26, 1939, Serial No. 286,661

4 Claims. (Cl. 242—70)

The present invention relates to a film support and more particularly to a film holder whereby a hollow film coil may be mounted upon or removed from a film holder without relative movement between the convolutions of the film coil.

One common objection to the present technique for handling hollow film coils is that the film convolutions are often relatively displaced to cause scratching of the film emulsion. Such scratches are particularly objectionable because such film coils generally carry miniature images and are greatly enlarged for making prints and any scratches in the emulsion are correspondingly enlarged during printing.

The primary object of the invention is the provision of a film core which has at least one longitudinal finger recess and camming surfaces on the leading end thereof so that such core may be inserted into a hollow film coil without interference with a thumb or finger which is holding the side edges of the film coil from relative displacement.

A further object of the invention is the provision of a film support including a sleeve mounted for rotation and adapted to receive a film holder which moves a spring member into frictional engagement with the supporting spindle and to provide a friction drag for the film holder.

Other and further objects of the invention will be apparent to those skilled in the art from the disclosure which follows.

The above and other objects of the invention are particularly useful in practicing a method of handling hollow film coils which comprises holding the edges of the film coil to prevent relative lateral movement of the film convolutions, inserting into the hollow center of the coil a film core which is provided with at least one longitudinal finger recess, winding the film onto a second film core also provided with at least one longitudinal finger recess, again holding the edges of the rewound film coil to prevent relative lateral movement of the film convolutions, and axially removing said film core from said film coil. The film core used in practicing the aforementioned method may have a plurality of longitudinal ridges between which longitudinal finger recesses are provided, and also has an inclined surface on the end of each ridge. Finally, a sleeve member is mounted for free rotation on a stationary spindle and is provided with a slot, a spring member is attached to said sleeve and has a portion protruding therefrom, the film holder or film core is provided with an axial hole and when said core is mounted on the sleeve the protruding portion of said spring member is moved into the slot in the sleeve and a portion of said spring member moves into frictional engagement with the spindle to provide a friction drag thereon.

Reference is hereby made to the accompanying drawing wherein similar reference characters designate similar elements and wherein:

Fig. 1 is a plan view of a viewing device equipped with a film handling arrangement of the invention.

Fig. 2 is a front elevation of such a viewing device with a partial section taken through the film gate thereof.

Fig. 3 is a longitudinal section through one of the film supports showing the frictional engagement of the spring member on the sleeve with the stationary spindle.

Fig. 4 is a side elevation of a hollow film coil mounted on a film core according to the invention and encircled by a peripheral retainer.

Fig. 5 is a perspective view showing the manner in which the side edges of the hollow film coil can be held between a thumb and finger while the film core which is provided with finger recesses is being inserted into or removed from the hollow film core.

In the illustrated embodiment of the invention, the viewing device comprises a base member 10 having arms 11 and 12 and provided with a film channel 13 and an exposure aperture 14. A cover plate 15 is hinged to base member 10 and is provided with an exposure aperture 16 registering with exposure aperture 14 of the base member 10 when the cover plate 15 is in the closed position shown. Film channel 13 has film engaging portions 17 and the cover plate 15 has film engaging portions 18 whereby only the marginal edges of the film F are engaged during movement of the film through the film gate formed by the base member 10 and cover plate 15. A pair of thumb screws 19 extend through base member 10 for attachment thereof to a base or frame, not shown.

Since the film support or film holder assemblies, according to the invention are the same, only one of them will be described in detail. Such a film support comprises a stationary spindle 20 fastened in the end of arm 12 by a bushing 21 and includes a sleeve member 22 which is maintained on spindle 20 by a headed screw 23 and which rotates freely on said spindle 20. Said sleeve member 22 has a knurled portion 24 at the outer end thereof and on its inner end carries a collar 25 having a tongue 26 and supporting a pin 27 in parallel relation to the spindle 20 and to sleeve member 22. Said sleeve member 22 is provided with a longitudinal slot 28 within and above which a spring member 29 is supported by sleeve 22. Said spring member 29 has a protruding portion 29' which extends beyond the periphery of sleeve 22, see Fig. 1, and said spring member 29 has portions 29" which are moved through the longitudinal slot 28 into frictional engagement with the stationary spindle 20 under circumstances to be described.

The film holder or film core comprises a body portion 30 which is provided with an axial opening 31 and which has a plurality of longitudinal ridges 32 between which longitudinal finger recesses 33 are provided. The peripheries of said longitudinal ridges 32 preferably form sections of a cylinder while the finger recesses 33 are preferably cylindrically concave therebetween. The ends of the body portion 30 are provided with notches 34 which are centered with respect to finger recesses 33 and one of which engages the tongue 26 on collar 25 when the film core is inserted onto the sleeve member 22. Upon such mounting of the film core on the sleeve member 22, the wall of the axial opening 31 therein will bear against the protruding portion 29' of spring member 29 and move said portions 29'' of spring member 29 into frictional engagement with the stationary spindle 20, see Fig. 3. Each and every longitudinal ridge 32 has an inclined or cam surface 35.

The hollow film coil 36 has side edges 36' and may be encircled by a peripheral retainer 37 of cardboard or other suitable material. However, the advantages of the invention may be accomplished without such a retainer 37, although such retainers are commonly provided for shipping or transporting the hollow film coils 36.

The handling of hollow film coils, may now be practiced in the following manner: The side edges 36' of the hollow film coil 36 are grasped between a thumb 38 and finger 39 of the operator so that the convolutions of hollow film coil 36 cannot be relatively moved particularly in a lateral direction. The film core is now inserted into the center of said hollow film coil 36 and the inclined or cam surfaces 35 on the ends of ridges 32 facilitate such insertion while the finger recesses 33 receive the fingers of the operator so that there is no interference between the film core and the operator's fingers when the core is inserted. The circumscribed surface of the peripheries of ridges 32 is slightly larger than the hollow center of the hollow film coil 36 and the inner convolutions of said coil 36 may be slightly squared upon insertion of the film core. It is also understood that the same step may be accomplished before the peripheral retainer 37 is removed from the film coil 36. The hollow film coil 36 and film core are then mounted upon one of the sleeves 22 and the film F is threaded through the film gate formed by base member 10 and cover plate 15. Another film core is mounted on the other sleeve member 22 with one of the notches 34 in engagement with tongue 26 on collar 25 whereby the pin 27 is centered with respect to one of the finger recesses 33. Such relative location of the pin 27 and one of the finger recesses 33 provides a film attaching arrangement so that the end of film F may be inserted under the pin 27 and within one of the finger recesses 33, see Fig. 2. The film is then wound through the film gate of the apparatus onto the other film core and during such winding the spring members 29 of the film supports will provide a friction drag between sleeves 22 and spindles 20.

When all of the film has been rewound onto the other film core, the same or another peripheral retainer 37 may be placed over the film coil 36. Whether or not such retainer 37 is used, the film core and film coil 36 are now removed from the sleeve 22. The hollow film coil 36 is held by its edges between a thumb and finger of the operator which again enter the finger recesses 33 of the film core and the film core may be axially removed from the film coil, while the side edges of said hollow film coil 36 are held against relative lateral movement by the operator's fingers.

It is clear that in this manner a hollow film coil may be wound from one film support to another without scratching or abrasion of the film emulsion and also that it is not necessary to provide a permanent film core for each film coil in order to safely but conveniently handle the hollow film coils.

Since other modifications of the invention are possible, as will be readily understood by those skilled in the art, the present disclosure is to be construed in an illustrative sense, while the scope of the invention is defined in the following claims.

Having now particularly described my invention what I desire to secure by Letters Patent of the United States and what I claim is:

1. In a film support, the combination with a stationary spindle, a sleeve mounted for free rotation on said spindle and provided with a slot, and a spring member attached to said sleeve and having a portion protruding therefrom and normally spaced from said spindle, of a film holder provided with an axial hole and removably mounted on said sleeve to move the protruding portion of said spring member into said slot and to move a portion of said spring member into frictional engagement with said stationary spindle.

2. In a film support, the combination with a stationary spindle, a sleeve mounted for free rotation on said spindle and provided with a slot, a spring member attached to said sleeve and having a portion protruding therefrom, and a pin attached in spaced relation to said sleeve, of a film core provided with an axial opening and with at least one longitudinal finger recess and removably mounted on said sleeve to move a portion of said spring member into frictional engagement with said stationary spindle and to move said finger recess into film end holding relation to said pin.

3. In a film support, the combination with a stationary spindle, a sleeve mounted for free rotation on said spindle and provided with a slot, a spring member attached to said sleeve and having a portion protruding therefrom, a tongue on said sleeve, and a pin mounted in spaced relation on said sleeve, of a film core provided with an axial opening, with at least one longitudinal finger recess, and with a notch in predetermined relation to said recess and said film core being removably mounted on said sleeve to move a portion of said spring member into frictional engagement with said stationary spindle, said tongue and notch engaging to center said pin within said finger recess.

4. A film support comprising a film core having a plurality of longitudinal ridges with cylindrical peripheral surfaces and between which ridges longitudinal finger recesses are provided, and inclined surfaces on each end of each ridge, extending from said peripheral surfaces toward the center of said core, and adapted, during axial insertion of the film core into a hollow film coil, to guide the inner convolutions of said coil onto said ridges.

OTTO WITTEL.